United States Patent Office 3,425,950
Patented Feb. 4, 1969

3,425,950
DYE PENETRANT
John Derbyshire, Jr., Los Alamitos, Isidore Pollack, Westminster, and Victor A. Pawloski, Long Beach, Calif., assignors to North American Rockwell Corporation
No Drawing. Filed Apr. 1, 1965, Ser. No. 444,788
U.S. Cl. 252—301.2                11 Claims
Int. Cl. C09k 1/02

ABSTRACT OF THE DISCLOSURE

A dye penetrant inspection technique and materials therefore are described. In particular, a solution of dye is hexachlorobutadiene-1,3 is employed for nondestructive testing of solid surfaces that may be contacted by liquid oxygen since the hexachlorobutadiene-1,3 suppresses the inherently violent reaction of conventional strong dyes with liquid oxygen.

---

In the fabrication of vessels and handling equipment for liquid oxygen and other strongly oxidizing materials it is often desirable to inspect weldments and other parts for minute cracks. An accepted industrial technique for detection of cracks involves the use of a penetrating liquid containing a dye. This material is applied to a solid surface to be inspected and if any cracks exist, some of the liquid is drawn into the cracks by capillary action. After allowing a sufficient time for penetration the excess liquid is rinsed or wiped from the surface. A powdery developer is then applied to the surface of the piece to be inspected and liquid containing the dye is drawn from any existing cracks to wet the large amount of surface on the powdery developer. Visual examination of the surface readily detects the presence of the dye in the background of developer thereby indicating the presence of any cracks that extend to the surface to be inspected. A particularly sensitive dye penetrant inspection technique employes fluorescent dyes which are observed under ultra-violet illumination.

A difficulty with the conventional dye penetrant inspection techniques is encountered in parts which may subsequently be contacted by liquid oxygen. It is found that very small concentrations of organic materials and the like combine with the highly oxidizing liquid oxygen in a rapid and possibly catastrophic manner. For this reason conventional dye penetrant materials that contain conventional organic materials are unacceptable for surfaces that may be wetted by liquid oxygen. Accidently remaining residues of these penetrants may react violently with liquid oxygen or other strongly oxidizing material.

Dye penetrant materials based on trifluorochloroethylene polymers are described in copending U.S. patent application Ser. No. 430,192 entitled "Dye Penetrant" by Ralph M. F. Giles and Isidore Pollack. It is found that materials having fluorine bearing compounds may react with aluminum or aluminum alloys during machining operations to remove cracked areas. Additionally the cost of trifluorochloroethylene polymer oils is high and dye penetrant inspection of large areas of surface is an expensive operation. Due to the low solubility of dye in trifluorochloroethylene polymers, volatile solvents are employed in making the formula and a possibility of dye precipitation exists.

It is therefore a broad object of this invention to provide an inexpensive dye penetrant material that is acceptable for use on aluminum surfaces that may be wetted by liquid oxygen.

Thus in the practice of this invention according to a preferred embodiment there is provided a dye penetrant solution comprising hexachlorobutadiene-1,3 chlorinated diphenyl and dye soluble in said hexachlorobutadiene and said chlorinated diphenyl.

Thus it is a broad object of this invention to provide a new dye penetrant material.

It is another object of this invention to provide a nondestructive testing technique.

Other objects and many of the attendant advantages of this invention will be readily appreciated as the same becomes better understood by reference to the following detailed description.

The stability of chemical compounds is directly related to the strength of the bond between the atoms of the compound. Strong bonds are formed between atoms that differ greatly in electronegativity, conversely weaker bonds have smaller electronegativity differences. Thus compounds having atoms which have a high electronegativity are relatively stable and also tend to react vigorously on formation. The electronegativity of atoms is attributed to their affinity for electrons. Those which have a high affinity for electrons have high electronegativity values and high heats of formation when forming compounds. This results in a very high degree of stability. The accepted electronegativity value for fluorine is 4.0 and the accepted value for oxygen is 3.5. Consequently fluorine and oxygen should exhibit a comparable degree of stability when bound in a compound. Chlorine has an electronegativity value of 3.0 which yields compounds which are highly stable but somewhat less stable than their fluorine counterparts.

It is found that despite the strength of the fluorine-carbon bond, reaction between fluorinated hydrocarbons and aluminum may occur under high shear conditions, such as in machining. Aluminum is less electronegative than carbon and may preferentially bond to fluorine. It has been found, however, that no such reaction occurs with chlorinated hydrocarbons substantially free of fluorine.

It is therefore desirable to formulate a dye penetrant material from organic compounds having a high degree of chlorination. It is found, however, that dye materials having a high degree of chlorination and a vivid appearance are not available. The available dyes are all highly reactive with liquid oxygen. Similarly the conventional solvents for dyes employed in dye penetrant inspection are also highly reactive with liquid oxygen. Similar reactivity is found with other strongly oxidizing materials such as $N_2O_4$ and the like.

It has been found in the practice of this invention that the use of hexachlorobutadiene-1,3 as a solvent or vehicle for dye prevents reaction between liquid oxygen and dye materials that normally would react violently with liquid oxygen. The mechanism of inactivation of the dyes by the hexachlorobutadiene-1,3 is not fully understood, however, it is hypothesized that the diluted dyes are dispersed to a degree that limits the ability of any reaction with liquid oxygen to be self-sustaining in the presence of the substantially inert hexachlorobutadiene-1,3.

Hexachlorobutadiene-1,3 serves as a base for dye in a penetrant system that has low vapor pressure, low cost and good dye solubility. Hexachlorobutadiene-1,3 has a proper viscosity for use as a penetrant and has a low surface tension giving good wetting on surfaces to be inspected. The vapor pressure at room temperature is less than 1 mm. Hg thereby yielding a material not subject to rapid evaporation. Hexachlorobutadiene-1,3 has a high stability due to the high electronegativity of the chlorine and is free of fluorine which may react with aluminum under some conditions due to the large electronegativity difference between fluorine and aluminum. No reaction has been obtained between hexachlorobutadiene-1,3 and aluminum even when subjected to high shear conditions by a rotary file. Tests of the compatibility of hexachlorobutadiene-1,3 with liquid oxygen under impact conditions at 72 foot-pounds as described hereinafter have indicated that no reactions occur.

In order to enhance the visibility of a penetrant, organic dyes are added to the hexachlorobutadiene-1,3 vehicle. These dyes provide a visible indicator with a high contrast with the surrounding surface. Thus, for example, in many dye penetrant inspection techniques the surface of the part to be inspected is coated with powdered white talc in order to draw the penetrant from minute cracks. In a system of this sort it is desirable to employ a dye having a high color for maximum contrast with the white background. A dye that is particularly useful because of the intense red color is a diazo type dye having the structure

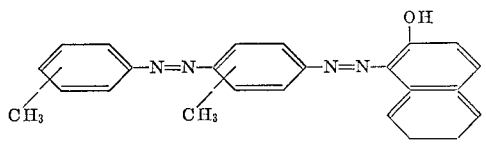

available under the trademark Oil Red O from Allied Chemical Corp., National Aniline Div., New York, N.Y., and under other names from other suppliers. Similarly it is often desirable in order to obtain a high degree of sensitivity for the detection of small cracks to employ dye that fluoresces under excitation by ultra-violet light. Particularly useful fluorescent dyes include a coumarin type dye, 4-methyl-7-diethyl amino coumarin, having the structure available

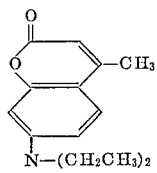

under the trademark Calcofluor White RW from American Cyanamid Co., New York, N.Y., and a naphthalimide type dye having the structure

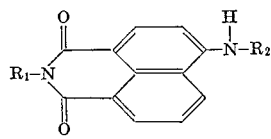

where $R_1$ and $R_2$ are each carbon groups having from 4 to 12 carbon atoms and wherein $R_1$ is different from $R_2$. Such a material is available under the trademark Fluorol 7-GA from General Aniline and Film Corp., New York, N.Y. It is preferred in the practice of this invention to employ a dye such as Calcofluor White RW and Fluorol 7-GA in combination to provide an optimum color range for visual sensitivity and a maximum fluorescent intensity.

It is preferred that the total dye be less than about two percent by weight since this approaches the saturation of dye in the solution and excessive precipitation of dye may lead to sensitivity of the penetrant to reaction with liquid oxygen. In any event it is preferred that the total dye be present in a ratio not greater than 1:30 to the hexachlorobutadiene-1,3 to give effective masking of any tendency for the dye to react with liquid oxygen. It has been found in using fluorescent dyes of the type indicated above, that a total dye concentration of less than one percent by weight is sufficient for good sensitivity and fluorescent brightness. It is preferred that a naphthalimide type dye be employed along with a coumarin type dye in a ratio in the range of from 1:1 to 5:1 respectively to obtain good fluorescent color in the penetrant and high brilliance of fluorescence. It is particularly preferred to employ 0.5 percent by weight of Fluorol 7-GA and 0.3 percent by weight of Calcofluor White RW since this composition gives optimum color and brilliance.

If any cracks are found in a surface, it is a usual practice to remove the faulty material and repair the area. Thus, for example, in an aluminum weld, any cracked area is machined away using a rotary file, hand file or milling cutter. The area is then rewelded to provide sound material and is preferably reinspected to assure freedom from cracks. In reworking parts, it is desirable to have a material in any existing cracks that will not react with the material forming the part and that, if possible, will assist in the machining operation. It is therefore desirable in many applications, particularly on aluminum alloys, to employ an extreme pressure agent in the dye penetrant solution based on hexachlorobutadiene-1,3. An extreme pressure agent acts to increase lubricity of the material and prevents breakdown of the penetrant liquid under the high shear forces of machining, thereby assisting in subsequent machining operations.

It has been found that up to about 25 percent by weight of chlorinated diphenyl as an extreme pressure agent in a hexachlorobutadiene-1,3 base gives a satisfactory penetrant having good lubricity, good sensitivity as an inspection material and displaying no reactions with liquid oxygen under impact conditions. That is, the concentration of chlorinated diphenyl is not greater than 1:3 relative to hexachlorobutadiene-1,3. Chlorinated diphenyl employed in the practice of this invention is preferred to have a chlorine content in the range of from 30 to 70 percent chlorine by weight. A material particularly well suited for use in the practice of this invention is a chlorinated diphenyl having 54 percent by weight of chlorine. Such a material is available under the trademark Aroclor 1254 from Monsanto Chemical Co., St. Louis, Mo.

Other extreme pressure agents are useful in the practice of this invention, however, due to increased tendency to react with liquid oxygen, the concentration of such materials in hexachlorobutadiene-1,3 is preferably less than about five percent by weight. Typical extreme pressure agents found suitable for use in the practice of this invention include tris-dichloropropyl phosphate, tris-B chloroethyl phosphate, di-2-ethyl chloromethyl phosphonate, dipropyl chloromethyl phosphonate, perchloroethylene, and octyl diphenyl phosphate. These extreme pressure agents are relatively less sensitive to reaction with liquid oxygen than are mineral oil lubricants because of the lower hydrogen content and the chlorinated or oxygenated substitution groups.

Similarly a fluorinated hydrocarbon such as trifluorochloroethylene polymer can be employed in the dye penetrant solution in quantities up to about five percent by weight. Trifluorochloroethylene polymer serves to increase viscosity of the penetrant solution and contributes some to lubricity. When trifluorochloroethylene polymer is included it is preferred to also employ an extreme pressure agent such as chlorinated diphenyl in the solution to minimize the possibility of reaction with aluminum. In any event the concentration of fluorine containing hydrocarbon is preferably less than about five percent by weight in the solution to minimize the possibility of reaction with aluminum. With concentrations up to five percent by weight, no reactions with aluminum have been obtained under high shear conditions and it is considered that a solution having a concentration of fluorinated polymer less than five percent by weight is substantially free of reactive fluorine and is safe for use on aluminum surfaces that may be subsequently machined or wetted by liquid oxygen. The hexachlorobutadiene-1,3 base for the dye penetrant solution apparently so thoroughly disperses the trifluorochloroethylene polymer that no self sustaining reaction can occur.

The trifluorochloroethylene polymer preferred in the practice of this invention comprises a carbon chain having the structure

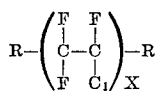

where X is in the range of from two to ten and R is selected from the class consisting of hydrogen and halogens. Trifluorochloroethylene polymers are available under the trademark KEL–F from Minnesota Mining and Manufacturing Co., St. Paul, Minn., under the trademark Fluorolube from Hooker Chemical Company, Niagra Falls, N.Y., from Halocarbon Products Co., Hackensack, N.J.., and from other suppliers of halogenated hydrocarbons.

Viscosity of the penetrant is increased by extreme pressure agents such as octyl diphenyl phosphate. Similarly the viscosity of the penetrant can be reduced by addition of small quantities of chlorinated solvents such as perchloroethylene, trichloroethylene, trichloroethane, methyl chloride and the like. Preferably less than about 20 percent by weight of chlorinated solvents are included in the penetrant. These materials are relatively volatile and changes in composition are minimized if the concentration of volatile ingredients is low. No need has been found to employ solvents in concentrations higher than 20 percent by weight since the hexachlorobutadiene-1,3 has a good viscosity for use as a dye penetrant vehicle. Surfactants and wetting agents can be added to the described dye penetrant, however, it is found that there is good wetting of surfaces without them, and there is no need for additives of this nature for most inspection techniques.

Thus the concentration of hexachlorobutadiene-1,3 is preferably in the range of from about 60 to 100 percent by weight, the concentration of chlorinated diphenyl is in the range of from about 0 to 25 percent by weight, dye is in the range of from about 0 to 2 percent by weight, extreme pressure agents selected from the class consisting of tris-dichloropropyl phosphate, tris-B chloroethyl phosphate, di-2-ethyl hexachloromethyl phosphonate, dibutyl chloromethyl phosphonate, dipropyl chloromethyl phosphonate, perchloroethylene and octyl diphenyl phosphate is in the range of from 0 to 5 percent by weight, trifluorochloroethylene polymer is present in the range of from 0 to 5 percent by weight, viscosity reducing chlorinated solvents that are insensitive to reaction with liquid oxygen are present in the range of from 0 to 20 percent by weight, and emulsifying agent may be present in the penetrant in the range of from about 0 to 10 by weight as described hereinafter. The dye penetrant solution is preferably substantially free from water, lower molecular weight alcohols, ketones and petroleum oils. It is particularly preferred that the dye penetrant solution comprise from 70 to 100 percent by weight of hexachlorobutadiene-1,3, from 0 to 25 percent by weight chlorinated diphenyl and from 0 to 2 percent by weight of dye soluble in said hexachlorobutadiene-1,3 and said chlorinated diphenyl.

A surface to be inspected for the presence of cracks is coated with a dye penetrant solution of the type above described. This solution is drawn into any cracks that open onto the surface by capillary action and in order to permit penetration into cracks of all sizes the penetrant is left undisturbed on the surface for a period of time. It is found in the practice of this invention that a dwell time on the surface of from about 5 to 10 minutes is preferred. This is sufficient to permit penetration of solution into fine thermal cracks and the like. Coating of solution may be by means of brushing, dipping or spraying; and spraying with a pump or aerosol can, and not an air atomizer is preferred.

After a penetrant is applied to a surface to be inspected and permitted to dwell thereon for a sufficient time for the penetrant to enter any surface cracks that may be present, the excess penetrant is removed. Removal can be by means of organic solvents such as acetone, methyl ethyl ketone or halogenated solvents such as trichlorofluoromethane, trichlorotrifluoroethane, trichloroethylene and carbon tetrachloride. The best solvents found are trichloroethylene and trichloroethane.

It is more economical and presents fewer material handling problems to employ water as the removal agent. The hexachlorobutadiene-1,3 employed in the practice of this invention is insoluble in water and an emulsifier is employed to make the system water washable. An emulsifier can be incorporated in the wash water, however, this requires a substantial quantity of emulsifier and washing efficiency is low. A satisfactory removal is also obtained by washing with a liquid detergent followed by a water rinse.

An emulsifier can be incorporated in hexachlorobutadiene-1,3 base penetrant to make the solution water washable. When in solution, it is preferred that the emulsifier be present in the range of from two to ten percent for good water washability. Lower concentrations may not give adequate cleaning and might just as well be omitted, and higher concentrations may interfere with action as a penetrant because of the large molecular size of typical emulsifiers.

It is preferred to employ a technique known to those skilled in the art as post emulsification. In this technique, the surface having the penetrant thereon is coated with an emulsifier, or a solution having a very high concentration of emulsifier. The emulsifier remains on the surface for from five to ten minutes to thoroughly mix with the penetrant on the surface. The surface can then be flushed with water at substantial pressure to remove the penetrant and emulsifier.

Emulsifiers useful in the practice of this invention are soluble in the hexachlorobutadiene-1,3 and emulsify them in water, and include, for example, nonionic emulsifiers such as polyethoxylated phenol. A suitable polyethoxylated phenol has been found to be one having a structure

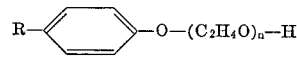

where $n$ is in the range of from five to ten and R is an isooctyl or nonyl group. Other emulsifiers such as alkyl aryl phosphate esters can be used. Such materials are available under the trademarks Igepal and GAFAC respectively from General Aniline and Film Corp., New York, N.Y. Amine salts of dodecyl benzene sulfonic acid and ammonium fatty acid soaps that are soluble in the hexachlorobutadiene-1,3, can also be used. A good class of emulsifiers includes the mahogany sulfonates produced in the petroleum industry. The emulsifiers can be applied directly to the penetrant employed in the practice of this invention or preferably are applied as a solution in hexachlorobutadiene-1,3. When applied as a solution in hexachlorobutadiene-1,3, the emulsifier is most rapidly blended with the penetrant on the surface and optimum washing characteristics are obtained. It is found that from about 8 to 20 percent by weight of emulsifier in hexachlorobutadiene-1,3 is preferred, concentrations lower than about 8 percent giving slow mixing with the penetrant and sometimes requiring more than one applicaiton to effect complete penetrant removal, and concentrations higher than about 20 percent showing no improvement over lower concentrations. It is particularly preferred to employ an emulsifier of the type described above in the range of from 10 to 12 percent by weight for optimum cleaning action at minimum cost.

Cleaning of the surface when a penetrant having fluorescent dye is employed is preferably under ultraviolet illumination so that any residual fluorescene can be seen and removed. It is found that with solvent removal and with water washing with emulsifier in the penetrant or in post emulsification there is no substantial bleeding of penetrant from cracks and good sensitivity is obtained with diverse removal techniques for the penetrant solution.

After excess penetrant is removed, visual indications of cracks are developed by coating the surface of the part with a material having a high amount of surface area. A preferred material for developing indications of cracks is finely powdered talc or a mixture of powdered talc and calcium carbonate or calcium hydrate. These materials are insensitive to reaction with liquid oxygen and provide a good indication of cracks. The talc is put on to the surface by dusting or dipping the workpiece in the powder or as a suspension in a carrier liquid. For a liquid developer from 5 to 15 percent of powder is suspended in water, isopropyl or ethyl alcohol, perchloroethylene, trichloroethylene, or the like and the mixture sprayed or brushed on the surface. The high surface area of the powder on the surface of the part draws penetrant from any cracks extending to the surface and the penetrant solution spreads away from the crack in the powdered material. Thus the apparent width of the crack is increased and the ability of an operator to detect cracks is enhanced. After the developer is left on the surface a few minutes indications of cracks are fully developed and are detected by visual examination. If colored dye is employed a high degree of contrast exists with the white talc background and if fluorescent dye is employed illumination under ultraviolet light gives high contrast with the dark background of non-fluorescing developer. Indications of cracks can also be developed by coating the surface with polyvinyl chloride or the like to form a continuous film. After dye soaks into the polyvinyl chloride the coating can be peeled off to retain a permanent record of indications.

The preparation and application of material prepared in the practice of this invention are illustrated in the following non-limiting examples.

Example 1

A solution was made up by mixing one gram of Fluorol 7–GA and 0.6 gram of Calcofluor White RW in 51 grams of Aroclor 1254. These materials were stirred at 150° F. until substantially all of the dyes were in solution. To this dye containing solution was added 148.5 grams of hexachlorobutadiene-1,3. The solution was permitted to stand at room temperature for 24 hours and then was filtered through a number one filter paper yielding a completely clear solution. It has been found that it is preferable although not necessary to dissolve the dyes in heated Aroclor 1254 (chlorinated diphenyl) rather than the hexachlorobutadiene-1,3 since a saturation solution is more readily obtained in this manner than when the dyes are initially dissolved in a solution including hexachlorobutadiene-1,3.

The ability of the dye penetrant solution to detect small cracks was evaluated according to the requirements of Military Specification MIL–I–25135. Test panels of 2014–T3 or 2024–T3 aluminum alloy were prepared according to this specification. Panels 3 inch x 2 inch were cut from 5/16 inch thick aluminum with the 3 inch dimension parallel to the direction of milling of the sheet. The panels were heated nonuniformly and water quenched to produce thermal cracks. This was accomplished by supporting the panel horizontally in a frame and impinging the flame of a torch in the center of the lower side of the panel without movement in any direction. A 950 to 980° F. temperature indicating crayon was applied to an area about the size of a penny on the top side of the center of the panel. The heat of the torch was adjusted so that the panel was heated approximately four minutes before the crayon melted after which the panel was immediately quenched in cold water. This operation was then repeated on the opposite side of the panel and a groove approximately 1/16 inch wide x 1/16 inch deep was cut in the 2 inch direction across the center of the heat affected zone on both sides of the panel to form two similar specimens and prevent cross contamination. Before using, the panels were cleaned by vigorous scrubbing with a bristle brush and trichloroethylene followed by a vapor degreasing.

A dye penetrant having a standard ability to penetrate cracks and provide a standard intensity of fluorescence as set forth in Military Specification MIL–I–25135 was applied to one-half of the aluminum panel. The other half of the panel as bounded by the panel edges and the 1/16 inch groove was coated with the dye penetrant prepared according to the practice of this invention as above described. These materials were permitted to remain on the surface for approximately ten minutes to permit full penetration into the surface thermal cracks. Both sides of the test panel were then scrubbed with trichloroethane for a one minute period. Other panels were coated with polyethoxylated phenol after penetration and washed with a spray of high pressure water to emulsify the penetrant solution. After the surface was dried in air it was examined under ultraviolet illumination to assure the absence of residual fluorescence. The ultraviolet had a characteristic wave length of about 3650 Angstrom units and an intensity of from 100 to 150 foot candles. The aluminum panels were then covered with a thin layer of developer to produce an indication of any cracks in the panel. The preferred developer is a mixture of from 5 to 15 percent of powdered talc suspended in trichloroethylene sprayed on the surface. Panels were also developed by the use of dry powdered talc applied to the surface.

After development the samples were visually compared to determine the ability of the above described dye penetrant to detect cracks as compared with the ability of standard penetrant solution to detect cracks in the two halves of the same aluminum panel. The density of cracks detected and fluorescent brightness were noted. It was found that the above described dye penetrant is at least as good as the standard dye penetrant in detecting surface thermal cracks in standard aluminum panels. Cracks as shallow as 0.030 inch are readily detected by the described technique.

In addition the dye penetrant solution described above has been employed for the detection of very fine thermal cracks in a specimen of weld in which stainless steel was welded to titanium. Such a specimen has a large number of thermal cracks which the above described penetrant satisfactorily revealed.

The penetrant solution above described was tested for compatibility with liquid oxygen. This test was performed by contacting a test material with liquid oxygen and impacting the material and the liquid oxygen with an energy of 72 foot pounds. It is considered that any material showing no reaction under these conditions is acceptable for use on surfaces that may be wetted by liquid oxygen. Any material yielding an audible explosion, a visible flash in a darkened room, discoloration or charring is not considered safe for use in contact with liquid oxygen.

The apparatus employed for impact testing comprises a rigid base into which an aluminum cup is inserted. A hardened stainless steel striker pin having a diameter of one-half inch is arranged so as to be adjacent the inside bottom of the aluminum cup. A plummet weighing 20 pounds is permitted to drop in a free fall for 43.3 inches and strike the striker pin thereby impacting the striker pin against the inside of the aluminum cup. A sample of the material to be tested is placed in the bottom of the aluminum cup with a thickness of 0.050 inch and the cup is filled with liquid oxygen prior to impact. It is found in employing such a test that no reactions between the above described penetrant and liquid oxygen have occurred despite testing of several hundred individual samples in thicknesses ranging from 0.002 to 0.050 inch. Many samples have been tested at an impact load of 81 foot pounds, the capacity of the available machine, rather than the prescribed 72 foot pounds and no reactions have been noted. It is therefore established that the dye penetrant described above is acceptable for use on surfaces that may be wetted by liquid oxygen.

Tests were made of surfaces after inspection to determine suitability for adhesive bonding and conversion coating. Both procedures were satisfactory, indicating that the surfaces are not harmed by the described penetrant.

In order to evaluate the possible reactivity of the dye penetrant in contact with aluminum under high shear conditions, a test was performed to establish the insensitivity of reaction with finely divided aluminum. For this purpose an aluminum plate was prepared having ¼ inch diameter holes ¼ inch deep therein. Approximately 0.1 milliliter of penetrant as described above was applied to each hole. A ⅜ inch rotary file was applied to each of the holes at about 1600 r.p.m. and at a substantial pressure as applied by a hand pneumatic drill. Each hole was reamed out to the full depth of ¼ inch. No visible or audible reactions with aluminum were observed in a large number of tests so performed.

Example 2

A solution was prepared by heating 20 percent by weight of chlorinated diphenyl, 0.5 percent by weight of Fluorol 7–GA and 0.3 percent of Calcofluor White RW at 150° F. until the dyes were completely in solution. Thereafter 74.2 percent by weight of hexachlorobutadiene-1,3 and 5.0 percent Fluorolube FS–5 were added to the solution and the mixture was permitted to stand at room temperature for 24 hours. Fluorolube FS–5 is a trifluorochloro-ethylene polymer of the type above described with an average molecular weight of 560. This material was filtered through a No. 40 Whatman filter paper to remove any residual dye crystals or other contaminants. This material is a satisfactory dye penetrant and no reactions were observed in impact testing by the same technique employed in Example 1. No reactions with aluminum under high shear machining conditions as described in Example 1 have been noted.

Example 3

Dye penetrant solutions made up according to the procedure set forth in Example 1 and having compositions in percent by weight as set forth in Table I are satisfactory dye penetrant materials and show no reaction with liquid oxygen when impact tested by the same technique set forth in Example 1, nor any reaction with aluminum in machining tests as set forth in Example 1. Solutions having no chlorinated diphenyl (Aroclor 1254) are made up by dissolving the dyes directly in hexachlorobutadiene-1,3 at about 150° F. The dyes comprise Fluorol 7–GA and Calcofluor White RW in a ratio of 5:3 respectively.

TABLE I

| Hexachloro-butadiene-1,3 | Total dye | Aroclor 1254 | Other |
|---|---|---|---|
| 74.2 | 0.8 | 20.0 | 5.0 fluorolube FS–5, 10.0 perchloroethylene. |
| 85.2 | 0.8 | 14.0 | |
| 74.2 | 0.8 | 20.0 | 5.0 octyl diphenyl phosphate. |
| 98.4 | 1.6 | | |
| 94.2 | 0.8 | | 5.0 fluorolube FS–5. |
| 74.2 | 0.8 | 10.0 | 5.0 trichloroethylene, 5.0 methylene chloride, 5.0 perchloroethylene. |

Example 4

Emulsifiers employing hexachlorobutadiene-1,3 as a base and having emulsifying agents dissolved therein were prepared for removal of dye penetrants from the surface of a part being inspected. A solution was made up having 88.0 percent by weight hexachlorobutadiene-1,3, 9.0 percent alkanolamine dodecyl benzene sulfonate with an average molecular weight of about 600 and 3.0 percent by weight ammonium dodecyl benzene sulfonate. Another solution was made up having 68.0 percent by weight hexachlorobutadiene-1,3, 20.0 percent by weight chlorinated diphenyl having 54 percent by weight chlorine, 9.0 percent by weight polyethoxylated nonyl phenol with an average of 4½ mols ethylene oxide and 3.0 percent by weight polyethoxylated nonyl phenol having an average of 10 mols of ethylene oxide. Another solution having 90 percent by weight hexachlorobutadiene-1,3 and 10 percent by weight of polyethoxylated isooctyl phenol with an average of 6 mols of ethylene oxide. Another solution was made up having 90 percent by weight of hexachlorobutadiene-1,3 and 10 percent by weight of polyethoxylated isooctyl phenol having an average of 7 mols of ethylene oxide. All of these materials are excellent emulsifiers for hexachlorobutadiene-1,3 base dye penetrant solutions. None of these materials have shown any reaction with liquid oxygen when subjected to impact conditions as set forth in Example 1. A solution having one of the compositions described is employed as an emulsifier preferably by spraying the part having a dye penetrant thereon with the solution and permitting the solution to remain on the surface for from five to ten minutes. Flushing the surface with water emulsifies the hexachlorobutadiene-1,3, the dyes and other ingredients in the penetrant and removes the excess penetrant from the surface to be inspected.

It is to be understood that the above described examples are illustrative of the application of the principles of this invention. Those skilled in the art may readily devise other variations that will embody the principles of this invention. It is therefore to be understood that within the scope of the appended claims the invention may be practiced otherwise than as specifically described.

What is claimed is:

1. A dye penetrant solution that is insensitive to reaction with liquid oxygen comprising:
    hexachlorobutadiene-1,3; and
    sufficient dye soluble in said hexachlorobutadiene-1,3 to provide a visible indicator with a high contrast with a surrounding surface.

2. A method of dye penetrant inspection comprising contacting a solid surface to be inspected with a dye penetrant solution that is insensitive to reaction with liquid oxygen comprising:
    hexachlorobutadiene-1,3; and
    dye soluble in said hexachlorobutadiene-1,3.

3. A method of removing a dye penetrant solution from a surface with an emulsifier that is insensitive to reaction with liquid oxygen under impact conditions comprising:
    contacting a surface having a dye penetrant solution that is stable in the presence of strongly oxidizing materials thereon with a solution that is stable in the presence of strongly oxidizing materials comprising hexachlorobutadiene-1,3 having an emulsifier dissolved therein in the range of from 8 to 20% by weight, said emulsifier being selected from the class consisting of polyethoxylated phenols, alkyl aryl phosphate esters, salts of dodecyl benzene sulfonic acid, ammonium fatty acid soaps and mahogany sulfonates that are soluble in hexachlorobutadiene-1,3; and
    washing the surface with water.

4. A dye penetrant solution that is stable in the presence of strongly oxidizing materials under impact conditions comprising:
    hexachlorobutadiene-1,3; and
    chlorinated diphenyl having from 30 to 70 percent of chlorine by weight in a ratio of not greater than 1:3 by weight relative to said hexachlorobutadiene-1,3; and
    sufficient dye soluble in said hexachlorobutadiene-1,3 and said chlorinated diphenyl to provide a visible indicator with a high contrast with a surrounding surface.

5. A dye penetrant solution that is insensitive to reaction with liquid oxygen comprising:
    hexachlorobutadiene-1,3;
    dye selected from the class consisting of a naphthalimide type dye having the structure

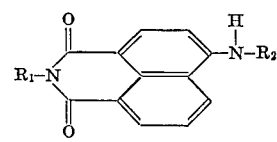

where $R_1$ and $R_2$ each comprise a group having from four to twelve carbon atoms and $R_1$ is different from $R_2$, a coumarin type dye having the structure

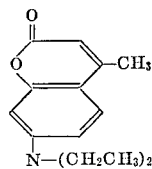

and a diazo type dye having the structure

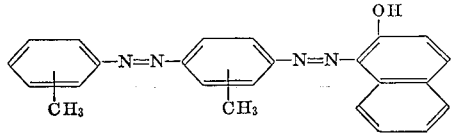

6. A dye penetrant solution that is insensitive to reaction with strongly oxidizing materials under impact conditions comprising:
hexachlorobutadiene-1,3; and
an extreme pressure agent in said hexachlorobutadiene-1,3, selected from the class consisting of tris-dichloropropyl phosphate, tris-B chloroethyl phosphate, di-2-ethyl hexachloromethyl phosphonate, dibutyl chloromethyl phosphonate, dipropyl chloromethyl phosphonate, octyl diphenyl phosphate, perchloroethylene and chlorinated diphenyl having from 30 to 70 percent chlorine by weight; and
dye soluble in said hexachlorobutadiene-1,3 and said extreme pressure agent.

7. A dye penetrant solution that is substantially insensitive to reaction with liquid oxygen comprising:
from 70 to 100 percent by weight of hexachlorobutadiene-1,3;
from 0 to 25 percent by weight of chlorinated diphenyl having from 30 to 70 percent of chlorine by weight;
from a sufficient quantity to provide a visible indicator with a high contrast with a surrounding surface to 2 percent by weight of dye soluble in said hexachlorobutadiene-1,3 and said chlorinated diphenyl.

8. A dye penetrant solution as defined in claim 7 wherein said dye is selected from the class consisting of a naphthalimide type dye having the structure

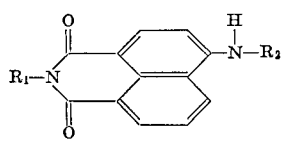

where $R_1$ and $R_2$ each comprise a group having from four to twelve carbon atoms and $R_1$ is different from $R_2$, a coumarin type dye having the structure

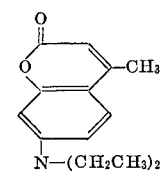

and a diazo type dye having the structure

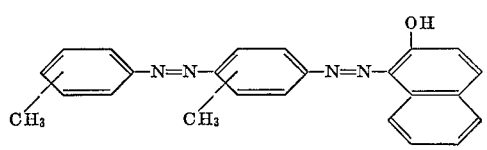

9. A dye penetrant solution that is insensitive to reaction with liquid oxygen under impact conditions consisting essentially of:
from 60 to 100 percent by weight of hexachlorobutadiene-1,3;

from 0 to 25 percent by weight of chlorinated diphenyl having from 30 to 70 percent by weight of chlorine;
from a sufficient quantity to provide a visible indicator with a high contrast with a surrounding surface to 2 percent by weight of dye selected from the class consisting of a naphthalimide dye having the structure

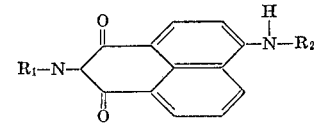

where $R_1$ and $R_2$ each comprise a group having from four to twelve carbon atoms and $R_1$ is different from $R_2$, a coumarin type dye having the structure

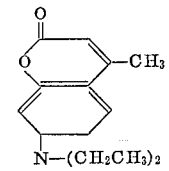

and a diazo type dye having the structure

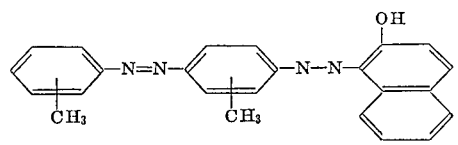

from 0 to 5 percent by weight of extreme pressure agent selected from the class consisting of tris-dichloropropyl phosphate, tris-B chlorethyl phosphate, di-2-ethyl hexachloromethyl phosphonate, dibutyl chloromethyl phosphonate, dipropyl chloromethyl phosphonate, perchloroethylene, and octyl diphenyl phosphate;
from 0 to 5 percent by weight of trifluorochloroethylene polymer selected from the class consisting of
$$R-(CF_2-CFCl)_x-R$$
where R is selected from the class consisting of hydrogen and halogens and X is in the range of from 2 to 10;
from 0 to 20 percent by weight of chlorinated viscosity reducing solvents that are insensitive to reaction with liquid oxygen under impact conditions; and
from 0 to 10 percent by weight of emulsifier selected from the class consisting of polyethoxylated phenols, alkyl aryl phosphate esters, salts of dodecyl benzene sulfonic acid, ammonium fatty acid soaps and mahogany sulfonates that are soluble in hexachlorobutadiene-1,3.

10. A dye penetrant solution that is insensitive to reaction with strongly oxidizing materials under impact conditions comprising:
74.2 percent by weight hexachlorobutadiene-1,3;
25 percent by weight chlorinated diphenyl having from 30 to 70 percent by weight of chlorine;
0.5 percent by weight of a naphthalimide type dye; and
0.3 percent by weight of a coumarin type dye.

11. A method of dye penetrant inspection comprising contacting a solid surface to be inspected with a dye penetrant solution comprising:
74.2 percent by weight hexachlorobutadiene-1,3;
25 percent by weight chlorinated diphenyl having from 30 to 70 percent by weight of chlorine;
0.5 percent by weight of a naphthalimide type dye; and
0.3 percent by weight of a coumarin type dye.

(References on following page)

References Cited

UNITED STATES PATENTS 3,108,187 10/1963 Thornbury _____ 252—301.2
3,184,596 5/1965 Alburger _____ 252—301.2

OTHER REFERENCES

Cross, "Introduction to Practical Infra-Red Spectroscopy," 1960, p. 19.

TOBIAS E. LEVOW, *Primary Examiner.*

J. COOPER, *Assistant Examiner.*

U.S. Cl. X.R.

252—408; 8—41, 89, 94; 250—43.5; 73—104